United States Patent [19]

Masuda et al.

[11] Patent Number: 6,127,638
[45] Date of Patent: *Oct. 3, 2000

[54] COMBINATION SWITCH

[75] Inventors: Hiromi Masuda; Tomoyoshi Kikkawa, both of Shizuoka, Japan

[73] Assignee: Yazaki Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/030,773

[22] Filed: Feb. 26, 1998

[30] Foreign Application Priority Data

Feb. 28, 1997 [JP] Japan .................................. 9-046067

[51] Int. Cl.[7] ...................................................... H01H 9/08
[52] U.S. Cl. ..................................... 200/61.27; 200/61.54
[58] Field of Search ............................. 200/61.27, 61.28, 200/61.54, 51.12, 51.05, 51.06, 295; 439/15

[56] References Cited

U.S. PATENT DOCUMENTS

| | | | |
|---|---|---|---|
| 3,719,787 | 3/1973 | Tomecek | 200/61.27 |
| 4,069,403 | 1/1978 | Beaudette et al. | 200/51.12 |
| 4,277,658 | 7/1981 | Delp et al. | 200/61.54 |
| 4,733,030 | 3/1988 | Erdelitsch et al. | 200/61.54 |
| 5,747,763 | 5/1998 | Uchiyama et al. | 200/61.54 |

FOREIGN PATENT DOCUMENTS

| | | | |
|---|---|---|---|
| 763447-A2 | 6/1996 | European Pat. Off. . | |
| 2 749 240 | 5/1997 | France . | |
| 2240131 | 8/1972 | Germany | 200/61.54 |
| 196 27 767 A1 | 1/1998 | Germany . | |
| 2 152 289 | 7/1985 | United Kingdom . | |

Primary Examiner—Renee S. Luebke
Attorney, Agent, or Firm—Sughrue, Mion, Zinn, Macpeak & Seas, PLLC

[57] ABSTRACT

A combination switch 31 includes a body 33 having at least one lever switch-mounting portion 41, 43 in which a lever switch 45, 47 is mounted, and a printed circuit board 51 having a printed wire portion 59 to which the lever switch 45, 47, mounted in the lever switch-mounting portion 41, 43, is electrically connected, wherein the printed circuit board has a fixed contact portion 55, 57 which is electrically connected to the printed wire portion 59, and projects into the lever switch-mounting portion 41, 43, the fixed contact portion being provided at that portion of the printed circuit board which contacts the lever switch.

3 Claims, 5 Drawing Sheets

COMBINATION SWITCH

BACKGROUND OF THE INVENTION

This invention relates to a combination switch provided in the vicinity of a handle column for controlling turn lamps, wipers and so on.

One known combination switch of the type described is shown in FIGS. 1 to 3. FIG. 1 is a cross-sectional view of the conventional combination switch in a direction of a steering shaft, FIG. 2 is an enlarged view of a body portion, and FIG. 3 is a view as seen in a direction of arrows A of FIG. 2. The combination switch 1 comprises a body 3 through which the steering shaft extends, a turn lever switch 5 for operating head lamps and turn lamps, a wiper lever switch 7 for operating wipers and a washer, and a control unit 9 having a control circuit.

The body 3 includes a steering shaft insertion portion 11 (see FIG. 3) formed in a central portion thereof, lever switch-mounting portions 13 and 15 (see FIG. 2) formed respectively in opposite sides thereof, and a control unit-mounting portion 17, and the body 3 has bus bars 19 for transmitting signals and electric current, the bus bars 19 being formed in the body 3 by insert molding. The bus bars 19 are arranged concentrically arcuately around the steering shaft insertion portion 11, and ends of part of the bus bars 19 serve as lever switch connection terminals 21 and 23 of the lever switch-mounting portions 13 and 15. The bus bars 19 project into the control unit-mounting portion 17, and serve as connection bars 25 which are connected to connection terminals of the control unit 9, and the various switch signals are transmitted to the control circuit on a board through the bus bars 19. Reference numeral 27 denotes a cover for covering the control unit 9.

In the above conventional combination switch 1, however, the bus bars 19 are in the form of a complicated arcuate circuit, to which the units, spaced from each other in the direction of the circumference of the steering shaft insertion portion 11, are formed in the body 3 by insert molding, and therefore there has been encountered a problem that this combination switch is costly.

And besides, the bus bars 19 are formed integrally in the body 3 by insert molding, and also the units, including the control unit 9 and a steering angle sensor, must be mounted directly on the body 3, and therefore the body 3 must have mounting spaces for these members, and as a result the configuration of the body is complicated, and also it is difficult to combine the units into a preassembly, and therefore the time and labor, required for the assembling operation, could not be reduced.

SUMMARY OF THE INVENTION

The present invention has been made in view of the above problems, and an object of the invention is to provide a combination switch which is simple in construction, and can be produced at low costs, and in which the time and labor, required for mounting units, can be easily reduced.

The above object has been achieved by a combination switch of the invention comprising a body having at least one lever switch-mounting portion in which a lever switch is mounted; and a printed circuit board having a printed wire portion to which the lever switch, mounted in the lever switch-mounting portion, is electrically connected, wherein the printed circuit board has a fixed contact portion which is electrically connected to the printed wire portion, and projects into the lever switch-mounting portion, the fixed contact portion being provided at that portion of the printed circuit board which contacts the lever switch.

A steering angle sensor circuit portion and a control unit circuit portion can be formed at the printed circuit board.

In the combination switch of this construction, the lever switch and the printed circuit board, to which the other units are connected, are separate from the body, and the printed circuit board, as well as the body, can be formed into a simple configuration.

In the combination switch in which the steering angle sensor circuit portion and the control unit circuit portion are formed at the printed circuit board, it is not necessary to provide such circuits in the body as in the conventional construction, and as a result the number of the component parts is reduced. And besides, a steering sensor and an ECU (electronic control unit) connector can be beforehand mounted on the printed circuit board, and therefore by mounting the printed circuit board with these units on the body. These units can be mounted at a time on the body.

DETAILED DESCRIPTION OF THE PREFERRED EMBODIMENTS

A preferred embodiment of a combination switch of the present invention will now be described in detail with reference to the drawings.

Figure 1:
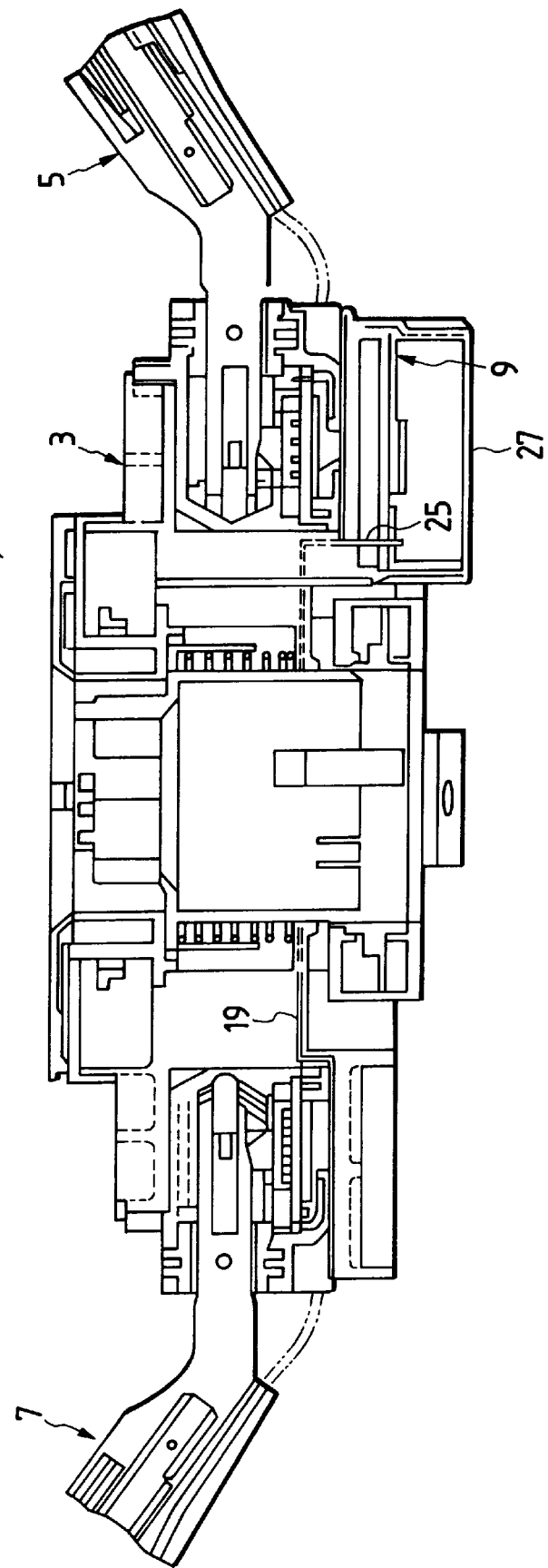
FIG. 1 is a cross-sectional view of a conventional combination switch in a direction of a steering shaft.
Figure 2:
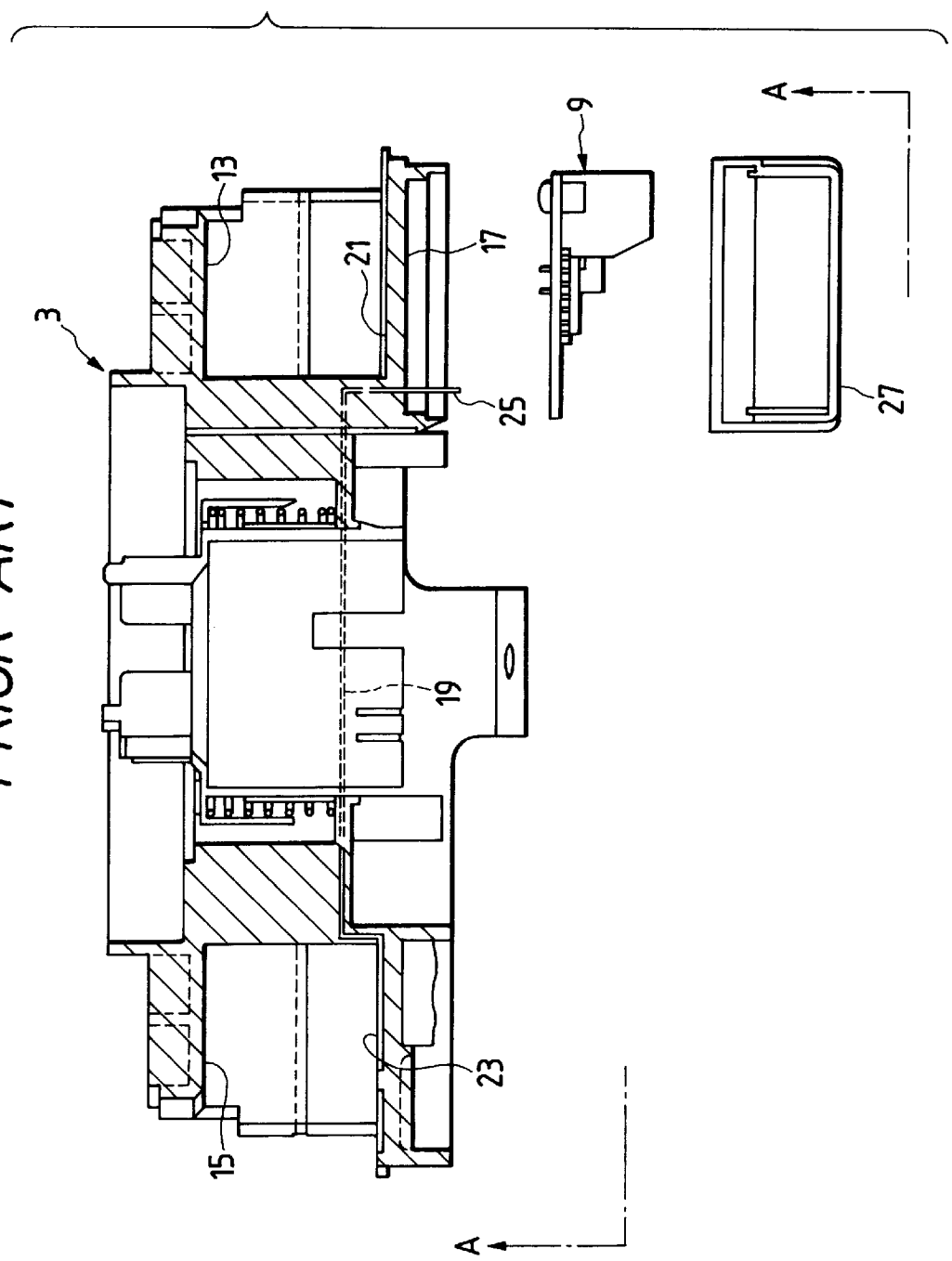
FIG. 2 is an enlarged view of a body portion of the switch of FIG. 1.
Figure 3:
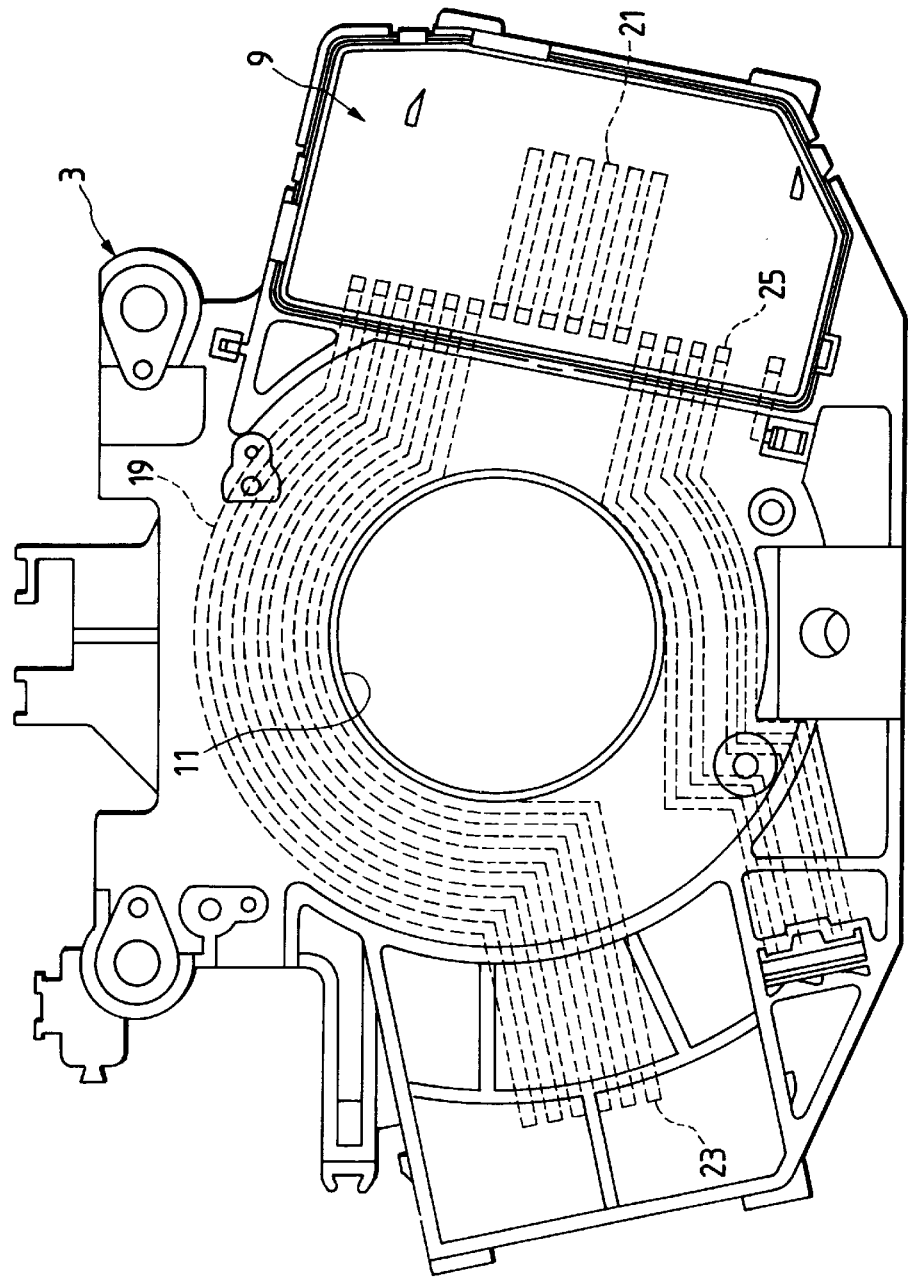
FIG. 3 is a view as seen in a direction of arrows A of FIG. 2.
Figure 4:
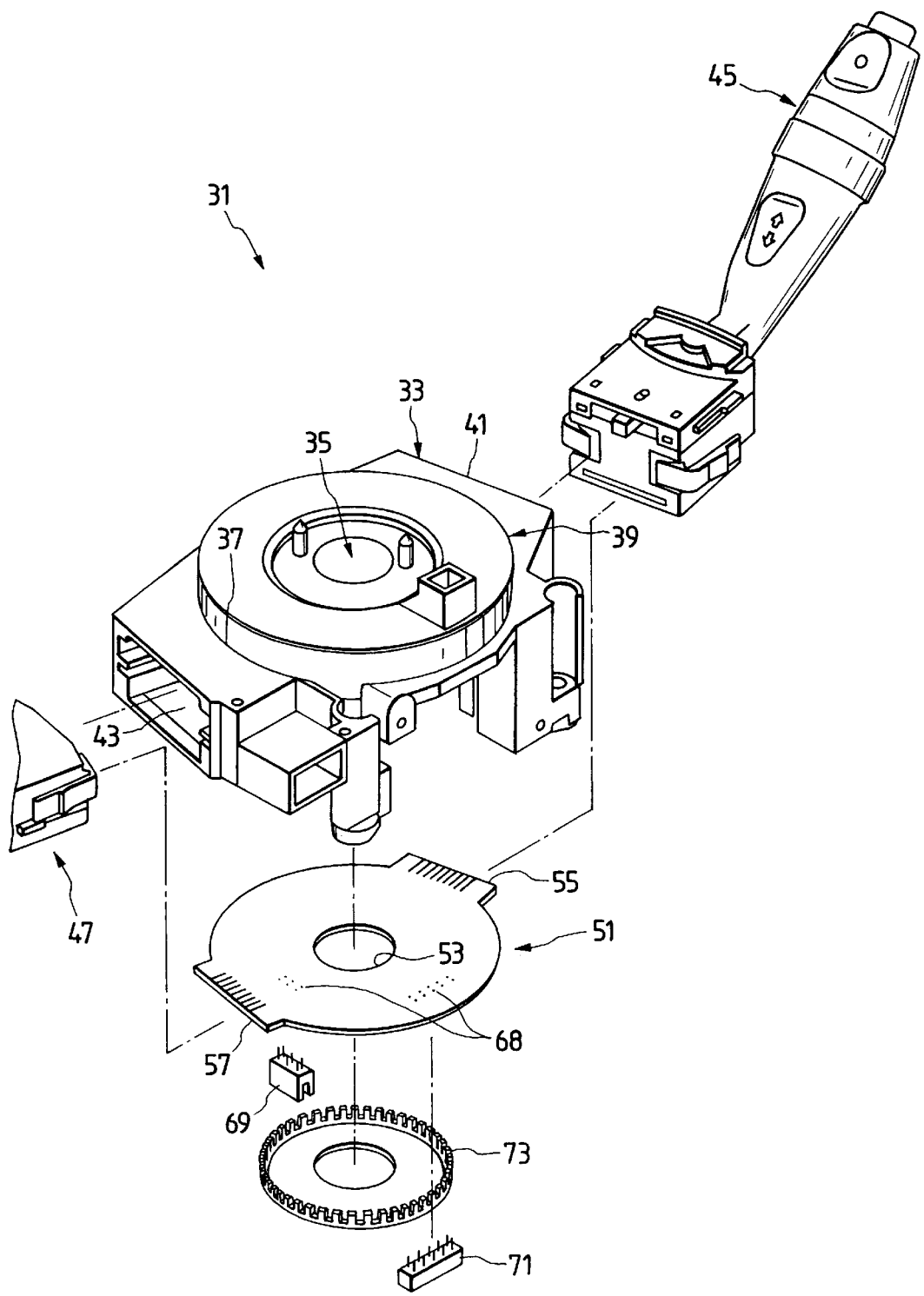
FIG. 4 is an exploded, perspective view of a combination switch of the present invention.
Figure 5:
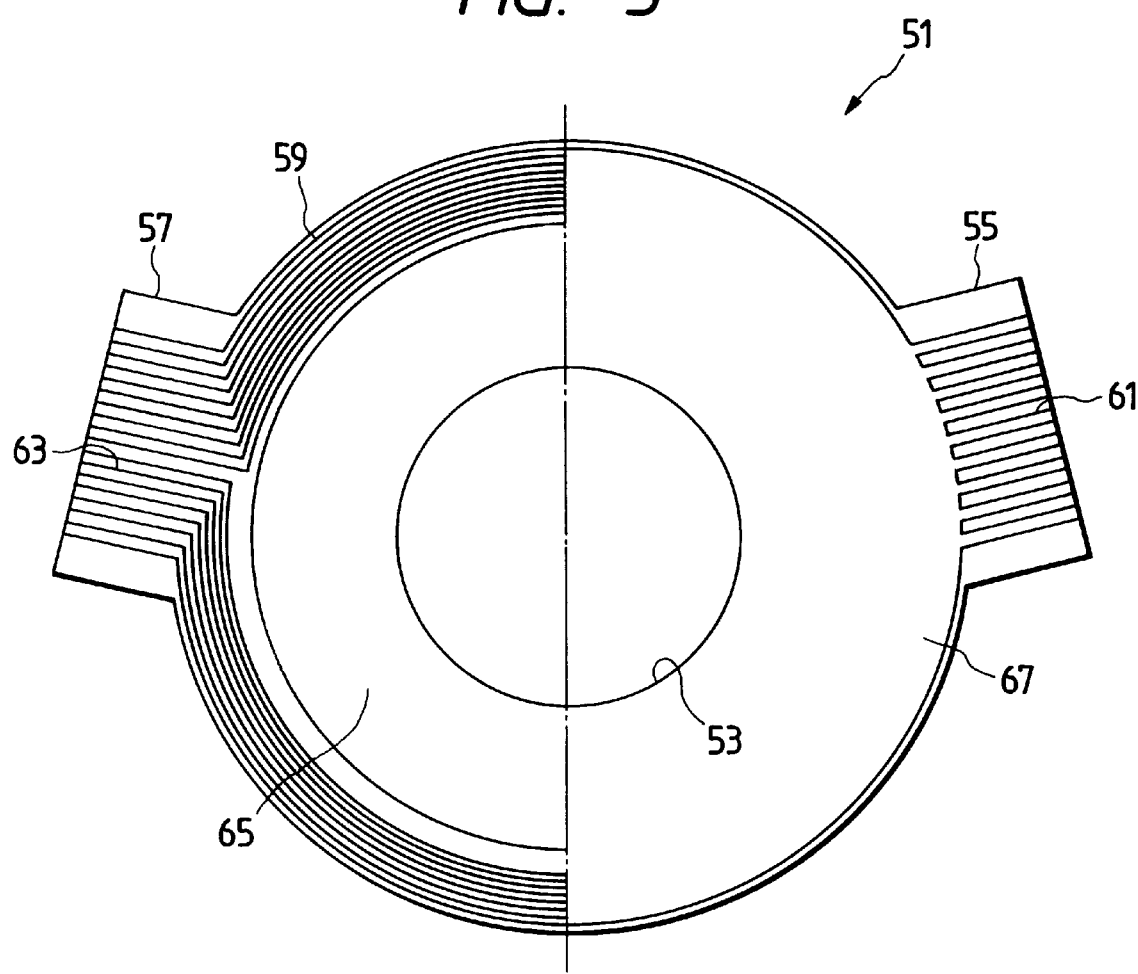
FIG. 5 is an enlarged plan view of a circuit board shown in FIG. 4.

FIG. 4 is an exploded, perspective view of the combination switch of the invention, and FIG. 5 is an enlarged plan view of a circuit board shown in FIG. 4.

A steering shaft insertion portion 35, through which a steering shaft extends, is formed through a body 33 of the combination switch 31. A SRC (steering roll connector) mounting portion 37 in the form of a cylindrical space, is formed in an upper surface of the body 33 in coaxial relation to the steering shaft insertion portion 35. A cable-type electric connection device 39 for supplying electricity to accessaries on the steering device is mounted in the SRC mounting portion 37.

Lever switch-mounting portions 41 and 43 are formed respectively in opposite sides of the body 33, and a turn lever switch 45 for operating head lamps and turn lamps and a wiper lever switch 47 for operating wipers and a washer are mounted respectively in the lever switch-mounting portions 41 and 43.

A board mounting portion (not shown) is formed in a lower surface of the body 33 in coaxial relation to the steering shaft insertion portion 35, and this board mounting portion is in communication with the lever switch-mounting portions 41 and 43. A disk-shaped printed circuit board 51 is mounted on this board mounting portion. A steering shaft insertion hole 53 is formed through a central portion of the printed circuit board 51. The printed circuit board 51 is fixedly secured to the board mounting portion, formed in the lower surface of the body 33, with the steering shaft extending through the steering shaft insertion hole 53.

Two fixed contact portions 55 and 57 extend radially outwardly from the outer periphery of the printed circuit board 51. When the printed circuit board 51 is fixed in position, the fixed contact portions 55 and 57 project respectively into the lever switch-mounting portions 41 and 43. A plurality of concentrically-arcuate printed wire portions 59 are formed on the printed circuit board 51 around the steering shaft insertion hole 53, and ends of part of the printed wire portions 59 are formed on the fixed contact portions 55 and 57, and serve as lever switch connection fixed contacts 61 and 63. Namely, the turn lever switch 45 and the wiper lever switch 47, mounted respectively in the lever switch-mounting portions 41 and 43, are electrically connected respectively to the lever switch connection fixed contacts 61 of the fixed contact portion 55 and the lever switch connection contact 63 of the fixed contact portion 57.

A steering angle sensor circuit portion 65 and a control unit (ECU) circuit portion 67 are formed on the printed circuit board 51. A steering angle sensor 69 and an ECU connector 71 are mounted respectively on the steering angle sensor circuit portion 65 and the control unit circuit portion 67 of the printed circuit board 51 through through holes 68 (see FIG. 4). When the printed circuit board 51 is mounted in position, the steering angle sensor 69, mounted on the printed circuit board 51, applies light to a slit portion of a slit plate 73 mounted on the steering shaft against rotation relative thereto, and the light, passed through the slits, is fed to an ECU (not shown), and is counted, thereby detecting the angle of rotation of the steering device.

For mounting the combination switch 31 of this construction, the steering angle sensor 69 and the ECU connector 71 are mounted on the printed circuit board 51, thereby forming the printed circuit board 51 into a preassembled condition, and then this printed circuit board 51 is mounted on the body 33. Then, the turn lever switch 45 and the wiper lever switch 47 are mounted respectively in the lever switch-mounting portions 41 and 43, and terminals (not shown) of the turn lever switch 45 are connected to the lever switch connection fixed contacts 61 of the printed circuit board 51 while terminals (not shown) of the wiper lever switch 47 are connected to the lever switch connection fixed contacts 63.

In the above combination switch 31, the turn lever switch 45, the wiper lever switch 47 and the printed circuit board 51 (to which the other units are connected), which are spaced from one another in the direction of the circumference of the steering shaft insertion portion 35, are separate from the body 33, and are adapted to be mounted on the body 33. Therefore, the printed circuit board 51, as well as the body 33, can be formed into a simple configuration, and this combination switch can be manufactured at lower costs as compared with the conventional product in which the bus bars in the shape of a complicated arcuate circuit are formed in the body by insert molding.

And besides, the steering angle sensor circuit portion 65 and the control unit circuit portion 67 are formed at the printed circuit board 51, and therefore it is not necessary to provide such circuits in the body as in the conventional construction, and as a result the number of the component parts is reduced, and also the space-saving design can be achieved.

Furthermore, the steering angle sensor 69 and the ECU connector 71 can be beforehand mounted on the printed circuit board 51, and therefore by mounting this printed circuit board 51 with these units on the body, these units can be mounted at a time on the body 33, and the time and labor, required for the assembling operation, can be reduced.

As described in detail, in the combination switch of the present invention, the lever switches and the printed circuit board, to which the other units are connected, are separate from the body, and are adapted to be mounted on the body, and therefore the body can be formed into a simple configuration, and the combination switch can be manufactured at lower costs as compared with the conventional product.

In the combination switch in which the steering angle sensor circuit portion and the control unit circuit portion are formed at the printed circuit board, the number of the component parts is reduced, and the space-saving design can be achieved, and by mounting the steering sensor and the ECU connector on the printed circuit board, the time and labor, required for the assembling operation, can be reduced.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A combination switch comprising:
   a main body having at least one lever switch-mounting portion having a switch receiving opening and a steering shaft insertion portion for receiving a steering shaft;
   a lever switch having switching components and electrical terminals self-contained therein, said lever switch being received in said switch receiving opening; and
   a pre-assembled printed circuit board having a printed wire portion to which said lever switch, received in said lever switch-mounting portion, is electrically connected, said pre-assembled printed circuit board being detachably mounted on said main body;
   wherein said printed circuit board has a fixed contact portion at a lateral side thereof, which is electrically connected to said printed wire portion, and projects into said switch receiving opening of said lever switch-mounting portion, said fixed contact portion being provided at a portion of said printed circuit board which contacts said electrical terminals of said lever switch.

2. A combination switch according to claim 1, in which a steering angle sensor circuit portion and a control unit circuit portion are formed on said printed circuit board.

3. The combination switch according to claim 1, wherein a slit plate is mounted on the steering shaft.

* * * * *